United States Patent [19]

Hirzel et al.

[11] 4,004,035
[45] Jan. 18, 1977

[54] METHOD AND APPARATUS FOR PRODUCING LAPPED SHREDDED FOOD ARTICLES

[75] Inventors: Rudolph W. Hirzel, Climax; Albert W. Olmstead, Pennfield; Winship C. Howard, Battle Creek, all of Mich.

[73] Assignee: Kellogg Company, Battle Creek, Mich.

[22] Filed: July 28, 1975

[21] Appl. No.: 599,669

[52] U.S. Cl. .............................. 426/275; 99/450.2; 99/450.7; 426/452; 426/502; 426/503
[51] Int. Cl.² ........................................... A21D 6/00
[58] Field of Search ............ 426/93, 452, 502, 503, 426/275; 99/450.1, 450.2, 450.7

[56] References Cited
UNITED STATES PATENTS

| | | | |
|---|---|---|---|
| 1,975,326 | 10/1934 | Loose et al. | 426/502 X |
| 2,013,003 | 9/1935 | Loose | 426/452 X |
| 2,693,419 | 11/1954 | Gager | 426/93 |
| 3,494,302 | 2/1970 | Wolf et al. | 426/503 X |
| 3,851,088 | 11/1974 | Albrecht et al. | 426/502 |

Primary Examiner—Robert L. Lindsay, Jr.
Assistant Examiner—Marc L. Caroff
Attorney, Agent, or Firm—Gary, Juettner

[57] ABSTRACT

A shredded food article in the form of a biscuit is produced by depositing a web of longitudinally shredded food transversely across a moving bed in a uniform overlapping zigzag configuration to produce a wider, continuous, multiple layer sheet. The sheet is first cut longitudinally and is then cut transversely to produce a plurality of files and rows of lapped shredded biscuits on the moving bed. The process may include two separate lapping operations in which a flavorful filling is deposited between laps to produce a composite biscuit having an interior filling.

9 Claims, 6 Drawing Figures

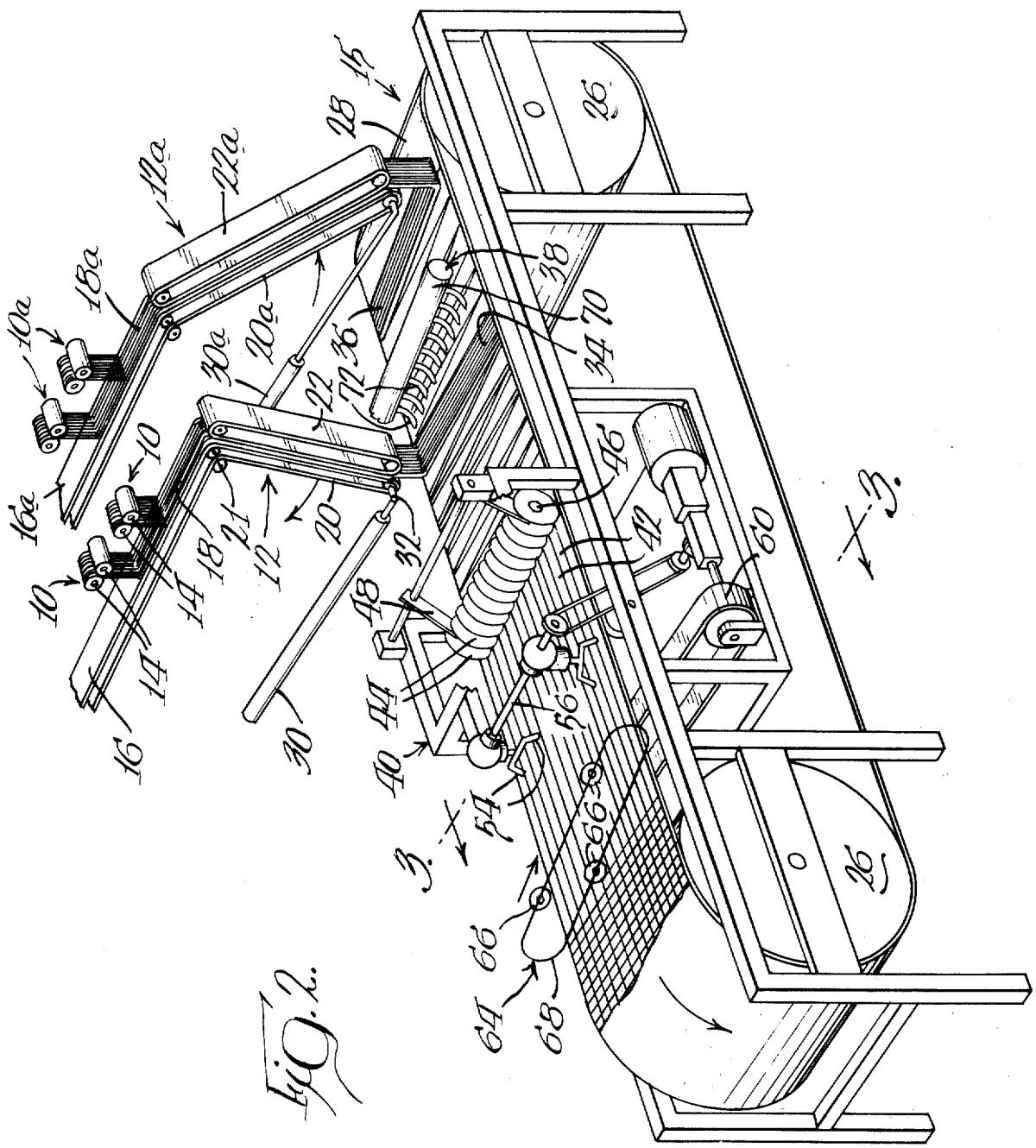

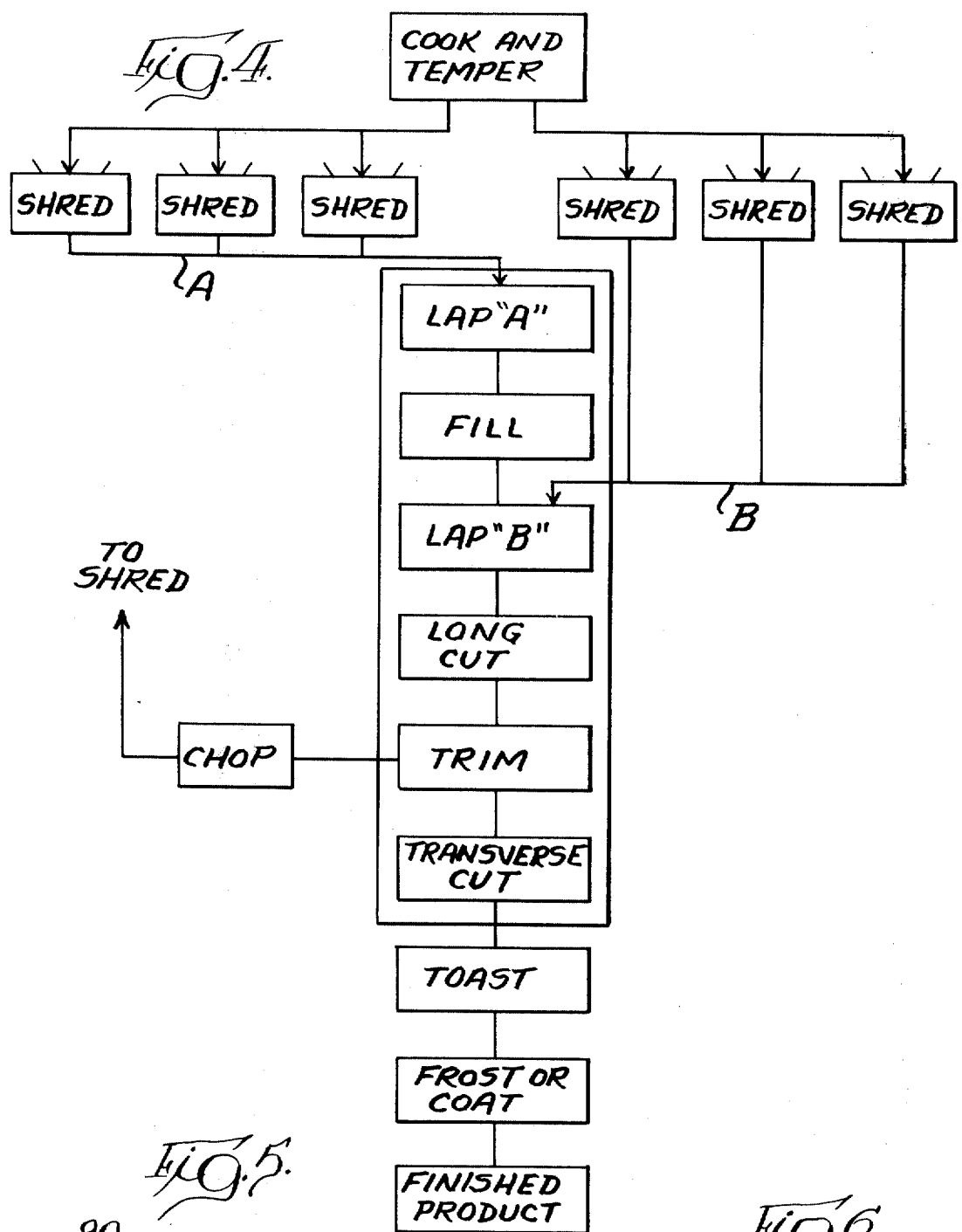

METHOD AND APPARATUS FOR PRODUCING LAPPED SHREDDED FOOD ARTICLES

BACKGROUND OF THE INVENTION

Devices for making shredded cereal biscuits are well known. In the conventional process, wheat or a combination of wheat and other grain is first softened by cooking and tempering and is fed into each of a series of shredding mills. The conventional shredding mill comprises a pair of closely spaced rolls that rotate in opposite directions, with at least one of the rolls having circumferential grooves. Upon passing between the rolls, the wheat is deformed into long individual strings or shreds.

The shredding mills are arranged in a linear series across a common conveyor, with the shreds running longitudinally or in parallel with the direction of movement of the conveyor. A typical biscuit, for example will contain up to 21 individual layers of shreds, thus requiring as many as 21 separate shredding mills along the conveyor.

Upon obtaining the requisite thickness, the multiple layer web is cut transversely across the shreds into a single line of individual biscuits. The biscuits are then toasted and may also be frosted before packaging. The cutting operation also serves to seal the severed edge of the biscuit, resulting in the well known configuration shown in U.S. Pat. No. Des. 48,001. One of the major disadvantages with the conventional system is the large amount of capital equipment required for a single biscuit line. Large scale production will require a number of separate lines, each with its own series of shredding mills, conveyor, cutting and handling devices, with biscuits being formed one at a time on the conveyor.

Another drawback with the conventional process is the inherent limitation on possible biscuit sizes. The shredding rolls have a fixed width and are therefore capable of producing a shred layer of only a single width. Although the shredded web may be subdivided longitudinally as well as being cut transversely, possible biscuit sizes are substantially limited. A major change in biscuit size might very well require a costly replacement of shredding mills.

A further difficulty with the conventional process lies in the cutting operation wherein the web of piled shreds is severed into individual biscuits. Either by necessity or practice, press type cutters or rotating contact cutters are employed to severe the web across the shreds. A typical cutting device is of the rotating paddle wheel type, in which individual blades contact the web at regular intervals. During continuous production, the ability of such cutting devices to perform satisfactorily is limited by the tensile strength and stickiness of the shredded material, in that the material will tend to adhere to the blade or the blade will not completely sever the material. Thus, although a wide range of products can be successfully shredded in shredding mills, only those products having rather specific properties in shredded form can be successfully shaped by conventional procedures.

SUMMARY OF THE INVENTION

The present invention utilizes one or a plurality of shredding mills that deposit a shredded web on a first moving conveyor. The first conveyor terminates in a reciprocating section supported at right angles above a wide moving bed. The reciprocating section moves back and forth across the width of the moving bed, causing the web of shreds to be deposited on the bed in an overlapping zigzag pattern.

The lapped web thus deposited is first divided longitudinally into a plurality of continuous parallel files by a rotating multiple disc cutter disposed across and in contact with the bed. The files are then cut transversely by one or more blades that move across the bed at regular intervals. The sequence and manner of cutting enables fabrication of biscuits from materials over a wide range of tensile strength and stickiness.

Economies in capital equipment are realized because a single shredding line is transformed into a wider web having an augmented thickness, and the wider web is severed to produce a plurality of rows and files of biscuits on a single bed. Fewer shredding mills are required. Production quotas over a wide range are possible simply by changing the initial shred input or increasing the number of lapping devices from one to two, and adjusting the degree of lap on the bed.

Furthermore, the size of the final biscuit is entirely independent of the width of the shredding rolls. As will be explained herein more fully, biscuit size and thickness may be very easily changed by simple modifications to the cutting devices and by simple changes in the speed of various machine components.

The shredded biscuit of the present invention is also more rugged than a conventional biscuit, having a lapped zigzag configuration in which the shreds are disposed on an angle relative to the sides and ends of the biscuits and the shreds of individual layers are disposed on opposite or crossing angles.

The addition of a second lapping device allows the introduction of a flavorful filling between the laps, resulting in a novel filled shredded biscuit.

THE DRAWINGS

FIG. 2 is a perspective view of the apparatus of the present invention, with portions thereof being shown in simplified form.

FIG. 4 is a flow chart illustrating the process steps of the present invention.

FIG. 5 is a perspective view of the product of the present invention.

FIG. 6 is a vertical view of the product similar to that shown in FIG. 5 and having an internal filling.

DESCRIPTION OF THE PREFERRED EMBODIMENT

Figure 1:
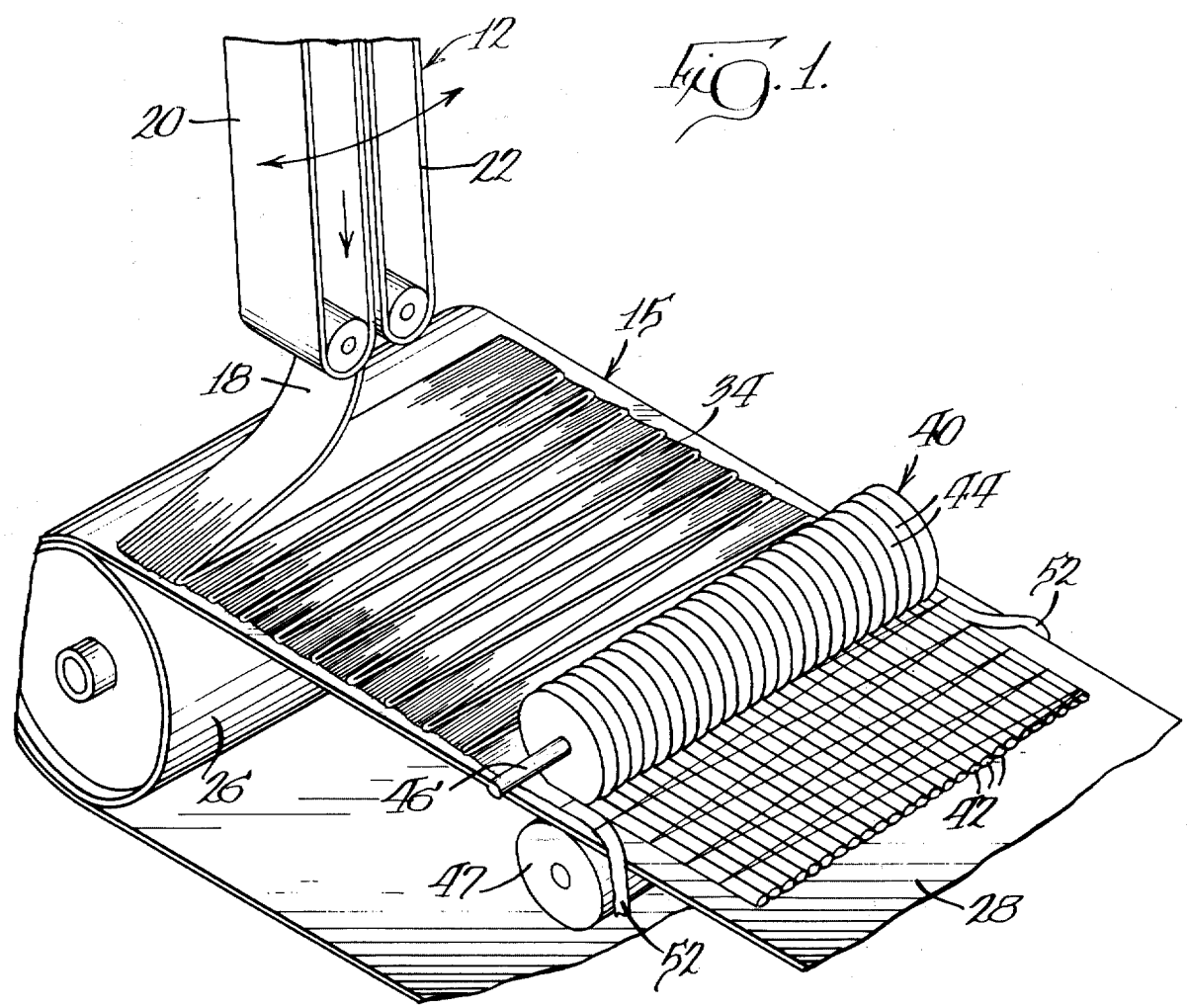
FIG. 1 is a fragmentary perspective view illustrating a portion of the apparatus of the present invention.

The essential elements of the present invention are shown in FIGS. 1 and 2. The apparatus of the present invention generally comprises one or more shredding stations 10 communicating with a lapping device 12 disposed over a moving bed 15 having the necessary cutting elements associated therewith downstream of the lapping site.

Each shredding station 10 comprises one or more conventional shredding mills comprising a pair of closely spaced rolls 14 of a given or fixed width. Preferably, one of the rolls has a smooth circumference and the other roll has a grooved circumference, as is well known in the art. The rolls are rotated toward one another, and cooked food is passed therebetween causing the food to be elongated into a plurality of individual strands or shreds. In the embodiment shown, a plurality of shredding mills are disposed across a common moving endless conveyor 16 which serves to transport a multiple layer or web of shreds away from the mills and to the lapping device 12. The shredding mills 14 are orientated such that the shreds are uniformly deposited and carried on the conveyor 16, with the shreds running longitudinally or in parallel with the direction of movement of the conveyor. Other known shredding devices may also be employed.

In the preferred embodiment, the food to be shredded will comprise whole wheat that has been softened by cooking and tempering. Other foods or food mixtures that are capable of being shredded may also be employed, either with or without wheat, including other cooked cereal, such as corn, oats, barley or bran, wheat germ, defatted soy, other vegetable protein, fruits, vegetable slurries and mixtures thereof, together with suitable vitamins, minerals, flavors and preservatives.

The lapping device 12 communicates with the conveyor 16 and comprises a conveyor section 20 hingedly connected to the end of conveyor 16 around shaft 21 and depending generally downward therefrom. Preferably, conveyor 16 and conveyor 20 are operated at substantially the same speed, said speed being sufficient to transport the shredded web 18 from the shredding mills 14 in a uniform manner. When hanging freely from the end of conveyor 16, the lower or free end of conveyor section 20 terminates in a spaced relationship over the inlet end of the moving bed 15, preferably substantially near the longitudinal center line thereof. An endless capture belt 22, stretched between suitable spaced rollers, is disposed closely adjacent and overlying the shred support surface of conveyor section 20 and coextensive therewith. The capture belt 22 is driven at the same speed as the section 20 and in a direction to support the shredded web 18 on the section, thereby to prevent the web from elongating or breaking by gravity in its downward travel on said section, or from falling away from the conveyor on the inward stroke of the lapping device 12.

The moving bed is preferably in the form of a wide, imperforate endless belt disposed around spaced rolls 26, at least one of which is driven, to move the belt in the direction indicated in FIGS. 1 and 2. The belt defines a flat upper horizontal support surface 28 upon which lapped shreds are applied by the lapping device 12, and the conveyor section 20 is disposed substantially perpendicular to the belt. The width of the belt is substantially wider than the width of the shredded web 18 being applied thereto.

Means are provided for moving the lower end of the conveyor section 20, together with the associated capture belt 22, back and forth or transversely across the width of the horizontal support surface 28 of the moving bed 15. Various types of motive devices may be employed to accomplish this purpose, and in the embodiment shown in FIG. 2, the rod of a linear reciprocating power cylinder 30 is connected to a non-rotating portion of the conveyor 20, such as an extension 32 from a roller shaft. The cylinder end of the power cylinder 30 is connected to a stationary support. The cylinder rod is extended and retracted at substantially a constant speed cycle to swing the hinged conveyor section 20 back and forth above the moving bed 15.

It may be seen in FIGS. 1 and 2 that as the conveyor section 20 swings back and forth across the support surface 28 of the moving bed 15, the web 18 of shredded food is deposited across substantially the entire width of the bed in a zigzag pattern. Also, the web 18 is deposited in such a manner that it overlaps itself evenly to produce a wide lapped web 34 of uniform thickness. The number of transverse laps per unit of width of the initial web 18 is determined by the speed of the moving bed 15 and the speed of the lapping device 12 both of which are desirably adjustable. Uniform thickness in the lapped web will generally be achieved if an even number of complete laps are accomplished per unit width of the initial web 18.

As shown in FIG. 2, an additional lapped layer 36 may be deposited on the moving bed 15 either upstream or downstream of the lapped layer 34 such that one lapped layer is applied over the top of the other. The additional shredding station, lapping device and parts associated therewith, designated by the suffix "a" in FIG. 2, may be identical to the corresponding parts previously described and will not be described in detail. It is sufficient to note that the shredding stations 10–10a operate in parallel and deposit their respective shredded webs 18–18a on the common bed 15 in a longitudinally spaced relationship. The use of a second lapping device not only allows for increases in production quantity and product thickness, but also allows for the introduction of a filling between the two layers by means of an intermediate filling device 38 (FIG. 2) as will be described hereinafter in greater detail.

After the lapped web 34 has been formed on the bed, the lapped web is then subdivided or cut into a plurality of lines and rows of individual biscuits or cakes of the desired shape and size. The cutting operation is preferably carried out with the web being supported by the bed surface 28, in order to prevent distortion or deformation of the product.

The web 34 is first passed into contact with a longitudinal cutting device, generally indicated at 40, which serves to divide the web into a plurality of continuous longitudinal portions 42. The device 40 preferably comprises a plurality of cutting elements such as cutting discs 44 disposed and supported in a spaced relationship across the moving bed 15 and in engagement with the horizontal surface 28 thereof. The discs 44 will preferably be equi-spaced and mounted for rotation on a common shaft 46 supported near its ends by a pair of arms 48 that are connected to support shaft 50. The discs 44 preferably rotate with the movement of the bed 14 to assure a clean cut, which is across the direction of shreds in the web 34, or at a slight angle thereto. In addition, a back-up roll 47 (FIG. 1) is preferably provided under the bed 15 beneath the discs 44.

Dividing the web first longitudinally is important to the success of the overall cutting operation. First, the rotating disc cutters assure a clean cut while minimizing the possibility of the product sticking to the disc. Secondly, the longitudinal cut does not disturb the continuity and integrity of the web 34, to the extent that the longitudinal portions 42 remain continuous and are connected to the web in the in-machine direction, with only a slight gap between adjacent portions.

Figure 3:
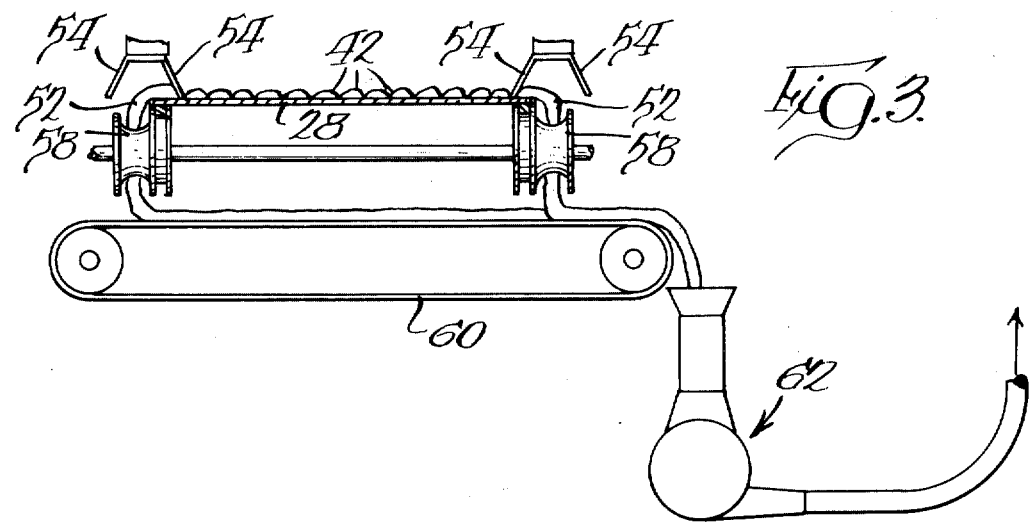
FIG. 3 is a vertical sectional view through the web trimming section of the device shown in FIG. 2, substantially along section line 3—3.

After the web has been cut longitudinally by the device 40, it is desirable to remove the side edge strips 52 of the web, which are generally bulky and non-uniform, due to the fold in the edges. Various means may be employed to remove and recycle these edge strips 52, with a preferred form being shown in FIGS. 2 and 3. A pair of spaced fingers 54 are supported above both side edges of the bed and are rotated into the path of the edge strips by a common shaft 56. Disposed beneath both sides of the bed 15 and the fingers 54 is a rotating guide or pulley 58, which serves to guide the strips onto a subjacent transverse belt conveyor 60. The conveyor 60 leads to the inlet of a pneumatic conveyor and chopper 62 by which the edge strips are chopped and returned to the shredding mills 14 for recycling.

The longitudinally divided and trimmed web 34 is then cut transversely by a second cutting device, indicated schematically at 64 for the sake of simplicity. The transverse cutting device is mounted on a bias across the moving bed 15 in the direction of movement thereof to accomodate movement of the bed during the cutting operation. The device 64 preferably comprises a plurality of cutting discs 66 rotatably mounted in a regularly spaced relationship on an endless chain or belt 69; the belt and associated discs are driven continuously in a loop and in a path across the bed 15 by suitable driving means (not shown) in the direction indicated by the arrow in FIG. 2. The cutting discs preferably engage against the bed 15 during the cutting or severing operation to assure a clean cut. The transverse cutter 64 serves to divide the longitudinal portions or ribbons 42 of the lapped shredded food into a plurality of lines and rows of closely spaced biscuits, cakes or wafers, preferably in a rectangular or square shape. It will be noted that since the transverse cutter 64 operates substantially in parallel to the orientation of the shreds, product integrity or continuity is less critical to assure a clean cut.

As mentioned hereinbefore, the use of two separate lapping devices allows for the introduction of a distinctive or flavorful filling material between the lapped layers 34 and 36. As shown in FIG. 2, a first lapped layer 36 of shredded food is deposited on the moving bed. A filling device 38 is positioned across the bed at the location that is longitudinally between the area of the first and second lapping operations. In the embodiment shown, the filling device is suitable for handling viscous flavorful fill materials and comprises a header 70 connected to a pressurized supply of fill material (not shown) and supported above the surface of the bed 14 and the initial lapped web 36.

A plurality of equi-spaced discharge tubes 72 extend from the header 70 and supply spaced continuous longitudinal ribbons of filling onto the surface of the web 36. It is apparent that other types of filling devices could be employed, including a device for depositing a sheet of fill material uniformly across the entire web, or a device for applying intermittent deposits or globules of material.

The type of food fill material employed is not critical, so long as the fill is compatible with the shredded material in the finished product. Also, the fill should have sufficient body, whether in liquid or solid form, to minimize loss of the fill through the lower shredded layer during processing. Particularly suitable fill materials will have a viscous liquid base and may contain distinctive artificial or natural flavorings such as fruit, cheese or meat, as well as sweeteners, seasoning, or the like, including suitable mixtures thereof, together with or additionally including any suitable additional ingredients or mixtures which impart desirable taste, aroma, texture, mouth feel or color to the filling material. The fill should also be suitably formulated so as not to develop or allow growth of mold or bacteria in the environment in which the final product is to be packaged and stored.

After the fill has been applied, the second lapped layer 34 is applied over the first layer 36 and the fill material, thereby substantially surrounding the fill material on both sides by lapped shredded layers. The composite shredded and filled product is then divided longitudinally and transversely as hereinbefore described.

The longitudinal and transverse cutting operations also tend to seal the sides and ends of the resulting individual biscuits, thereby enhancing the integrity of the final product and preventing loose shreds at the sides. The cutting-sealing operations also serve to retain the filling, if any in the biscuit.

In the embodiment shown in FIG. 2, the tubes 72 of the filling device 70 are arranged so that the ribbon of fill material deposited therefrom will be located in the center, and spaced from the sides of each longitudinal portion 42. The resulting filled biscuit is shown in FIG. 6. The biscuit comprises respective upper and lower multiple lapped shred portions 80 and 82 which are merged together along the longitudinal sides 84 of the biscuit. The filling 86 is located in the center of the biscuit in the form of a longitudinally extending ribbon or mass, and the edges of the ribbon are spaced inwardly from the sides of the biscuit. In this manner the cutting discs 44 do not come into contact with the filling 86 during the longitudinal cutting operation.

FIG. 5 illustrates the outward appearance of the product of the present invention, with or without filling. The biscuit 90 includes multiple laps comprising at least an upper lap 92 and a lower lap 94, with each lap containing one or more layers of shreds. The shreds in adjacent laps are disposed on angle with respect to each other and with the sides and ends of the biscuit. As shown in FIG. 5, the top layer of shreds are disposed on a small angle from the perpendicular relative to the sealed sides 96 of the biscuit. The criss-cross pattern of shred throughout the thickness of the biscuit tends to result in a more stable or rugged food product, especially in comparison with conventional shredded biscuits in which the shreds are all perpendicular to the sides of the biscuits and tend to crumble away at the ends.

FIG. 4 is a flow diagram illustrating the process steps involved in the preparation of filled shredded wheat biscuits. Reading the diagram from top to bottom, the wheat grains are first cooked and allowed to temper until they are soft. Quantities of wheat are then shredded along the conveyor line "A" to produce a first web having three layers of shreds. The first web is then lapped onto the moving bed 15 at "Lap A" to produce a lapped web of desired thickness that is substantially wider than the first web.

Upon completion of the first lapped web, filling material is deposited thereon in the desired fashion. The filling preferably is a viscous liquid having a fruit or cheese flavor. A second group of shredders is arranged along line B, and a second narrow web of shreds is lapped onto the filled lower layer at "Lap B." Thereafter, the composite web is first cut longitudinally and trimmed as desired. The longitudinal sections are then cut transversely to produce a plurality of rows and lines of biscuits on the moving bed 15.

The biscuits are then transferred off the end of the moving bed 15 and passed in a continuous fashion through a toasting oven. After toasting, the product may be coated with a sweet frosting before packaging.

Some primary advantages of the present system over conventional shredded biscuit systems is the wide range of production capability and the ability to regulate biscuit size. Heretofore shredded biscuit thickness has been determined by the number of shredding mills on the line. For example, a biscuit with 11 shred layers would require 11 separate shredding mills.

In accordance with the present invitation, the thickness of the biscuit is augmented not only by the number of shredding mills but also by the frequency of the lapping device relative to the speed of the moving bed. Hence, it is entirely feasible to use one or two shredding mills, for example to produce a biscuit having 10 or more shred layers, thus significantly reducing the capital requirements for production.

It should be understood that shredding mills must be operated at a certain minimal speed to assure proper function; otherwise the food will not be shredded. Heretofore, this fact has imposed a limitation on the minimum possible production, which limitation is entirely overcome by the present invention.

Furthermore, significant increases in production output can be obtained by simply adding a few additional shredding mills. Of course, it is also possible to vary shape and production by changing the speed of the moving bed and/or the lapping devices, particularly to accommodate the number of shredding mills in use.

Changes in biscuit length and width, which have heretofore not been feasible, are easily accomplished by the present invention. The distance between the longitudinal cutting discs 44 of the longitudinal cutter may be easily changed, and the spacing or speed of the discs 66 in the transverse cutter are also easily modified, thereby allowing for an unlimited variety of biscuit sizes.

We claim:

1. Method of preparing a shredded food article comprising the steps of shredding food into the form of a first web comprised of parallel strands of shredded food, lapping the first web back and forth transversely across a moving support bed to produce a second web composed of layers of shredded food strands, lying in an overlapping zigzag configuration on said bed, said second web having a width and thickness greater than that of the first web, and then dividing said second web into a plurality of separate articles.

2. The method of claim 1 comprising the further steps of shreddding food into the form of a third web comprised of parallel strands of shredded food, and lapping said third web in a zigzag configuration transversely back and forth across said second web prior to the division thereof to produce a composite web of shredded food strands having a width and thickness greater than those of the first and third webs.

3. The method according to claim 2 comprising the additional step of applying a separate food fill material to said second web before applying said third web thereto.

4. Method of preparing a shredded food article comprising the steps of first shredding the food into a first web comprised of longitudinally continuous parallel strands of shredded food that is of a given width and at least one shred layer of thickness, continuously depositing said web back and forth transversely across a moving support bed in an overlapping zigzag fashion to produce a second web of shredded food strands that is wider and thicker than said first web, then cutting said second web longitudinally into a plurality of longitudinal portions while carried on said bed, and then repeatedly cutting said portions transversely to form a plurality of individual shredded food articles.

5. The method of claim 4 comprising further steps of shredding food into a third web comprised of longitudinally continuous parallel strands of shredded food that is of given width and at least one shred layer of thickness, and then, prior to any cutting operation, continuously depositing said third web back and forth transversely across said second web in an overlapping zigzag fashion to add at least one additional layer of shredded food strands onto said second web.

6. The method of claim 5 comprising the further steps of applying a food filling to said second web prior to the deposition thereon of said third web.

7. The method of claim 6 wherein the filling is applied in the form of narrow ribbons on said second web, such that individual ribbons are enclosed within individual ones of said longitudinal portions upon completion of said longitudinal cutting operation.

8. The method of claim 4 comprising the additional step of removing side edge portions of said second web after completion of the longitudinal cutting step.

9. Method of preparing a shredded food article comprised of a given number of layers of shredded food strands comprising the steps of shredding food at each of no more than a number of shredding stations comprising an even fraction of said given number of layers in the article and laying the shredded food from said shredding stations into the form of a first web comprised of parallel strands of shredded food of a thickness no more than a number of shred layers comprising an even fraction of said given number of layers in the article, continuously depositing the first web back and forth transversely across a moving support bed in an overlapping zigzag configuration in which the number of overlaps is equal to said given number of layers in the article divided by the number of layers in said first web to form a second web of shredded food strands of a thickness equal to said given number of shred layers in the article, and then dividing said second web into a plurality of individual articles.

* * * * *